US011976723B2

(12) United States Patent
Shimokawara

(10) Patent No.: US 11,976,723 B2
(45) Date of Patent: May 7, 2024

(54) AUTOMATIC TRANSMISSION, CONTROL METHOD FOR AUTOMATIC TRANSMISSION, AND NON-TRANSITORY COMPUTER-READABLE MEDIUM

(71) Applicants: JATCO Ltd, Fuji (JP); NISSAN MOTOR CO., LTD., Yokohama (JP)

(72) Inventor: Kazue Shimokawara, Atsugi (JP)

(73) Assignees: JATCO LTD, Fuji (JP); NISSAN MOTOR CO., LTD., Yokohama (JP)

(*) Notice: Subject to any disclaimer, the term of this patent is extended or adjusted under 35 U.S.C. 154(b) by 0 days.

(21) Appl. No.: 18/261,903

(22) PCT Filed: Jan. 11, 2022

(86) PCT No.: PCT/JP2022/000468
§ 371 (c)(1),
(2) Date: Jul. 18, 2023

(87) PCT Pub. No.: WO2022/158325
PCT Pub. Date: Jul. 28, 2022

(65) Prior Publication Data
US 2024/0068564 A1 Feb. 29, 2024

(30) Foreign Application Priority Data
Jan. 20, 2021 (JP) .................... 2021-007014

(51) Int. Cl.
*F16H 61/662* (2006.01)
*F16H 45/02* (2006.01)
(Continued)

(52) U.S. Cl.
CPC ......... *F16H 61/6625* (2013.01); *F16H 45/02* (2013.01); *F16H 59/74* (2013.01);
(Continued)

(58) Field of Classification Search
CPC ........... F16H 61/6625; F16H 61/66231; F16H 2061/6608; F16H 2061/6611; F16H 59/74; F16H 2059/366
See application file for complete search history.

(56) References Cited

U.S. PATENT DOCUMENTS 7,427,254 B2 * 9/2008 Iwatsuki ............... B60W 10/18
477/92
7,976,427 B2 * 7/2011 Yamamoto ............ B60W 10/06
477/4
(Continued)

FOREIGN PATENT DOCUMENTS

JP         H10-169768 A       6/1998

*Primary Examiner* — Huan Le
(74) *Attorney, Agent, or Firm* — Foley & Lardner LLP

(57) ABSTRACT

[PROBLEMS] To reduce a sense of discomfort given to a driver due to vehicle deceleration caused by a downshift that is not intended by the driver, which is caused by a failure of a rotation speed sensor or the like.
[SOLUTIONS] An automatic transmission includes: a transmission mechanism configured to shift rotation of a driving source and transmit the rotation to a driving wheel; and a clutch configured to control transmission of a torque from the driving source to the driving wheel, wherein when a change rate of a rotation speed of the driving source is equal to or higher than a predetermined change rate, a torque transmission capacity of the clutch is reduced.

8 Claims, 3 Drawing Sheets

(51) Int. Cl.
*F16H 59/74* (2006.01)
*F16H 61/66* (2006.01)
F16H 45/00 (2006.01)
F16H 59/36 (2006.01)

(52) U.S. Cl.
CPC .. *F16H 2045/005* (2013.01); *F16H 2059/366* (2013.01); *F16H 2061/6608* (2013.01); *F16H 2061/6611* (2013.01)

(56) References Cited

U.S. PATENT DOCUMENTS 10,479,366 B2 * 11/2019 Park ..................... B60W 30/19
10,859,159 B2 * 12/2020 Zavala Jurado ...... F16H 61/143

* cited by examiner

AUTOMATIC TRANSMISSION, CONTROL METHOD FOR AUTOMATIC TRANSMISSION, AND NON-TRANSITORY COMPUTER-READABLE MEDIUM

The present application claims a priority of Japanese Patent Application No. 2021-007014 filed with the Japan Patent Office on Jan. 20, 2021, all the contents of which are hereby incorporated by reference.

TECHNICAL FIELD

The present invention relates to an automatic transmission, a control method for the automatic transmission, and a program.

BACKGROUND ART

Patent Literature 1 discloses a control device for a vehicle equipped with an automatic transmission including a fail downshift detecting unit that detects that a shift from a high speed-side speed ratio to a low speed-side speed ratio at which engine braking works has occurred due to a fail, and a braking force reducing unit that reduces a braking force of a driving force source for traveling when the shift is detected by the fail downshift detecting unit.

A fail downshift is determined by, for example, that a second solenoid valve that should be in an ON state is in an OFF state, or that a speed ratio obtained by calculating from an input rotation speed and an output shaft rotation speed of the automatic transmission is different from a speed ratio of a second speed.

PRIOR ART DOCUMENT

Patent Literature

Patent Literature 1: JP H10-169768 A

SUMMARY OF INVENTION

For example, if a calculated actual speed ratio is an abnormal value due to a failure of a rotation speed sensor related to calculation of the speed ratio, it is conceivable that a shift to a target speed ratio causes a downshift that is not intended by a driver. However, in this case, the fail cannot be determined by the technique described above. Therefore, there is a possibility that the braking force reducing unit does not operate, and that vehicle deceleration due to the downshift gives the driver a sense of discomfort.

The present invention has been made in view of such a technical problem, and an object thereof is to reduce a sense of discomfort given to a driver due to vehicle deceleration caused by a downshift that is not intended by the driver, which is caused by a failure of a rotation speed sensor or the like.

According to one aspect of the present invention, an automatic transmission includes: a transmission mechanism configured to shift rotation of a driving source and transmit the rotation to a driving wheel; and a clutch configured to control transmission of a torque from the driving source to the driving wheel, wherein when a change rate of a rotation speed of the driving source is equal to or higher than a predetermined change rate, a torque transmission capacity of the clutch is reduced.

According to the above aspect, when a change rate of a rotation speed of a driving source is equal to or higher than a predetermined change rate, a torque transmission capacity of a clutch is reduced. Accordingly, a braking force of the driving source is relaxed, deceleration is reduced, and a sense of discomfort given to the driver can be reduced.

DESCRIPTION OF EMBODIMENTS

Hereinafter, an embodiment of the present invention will be described with reference to the accompanying drawings. Hereinafter, a case where a speed ratio is large is referred to as Low, and a case where a speed ratio is small is referred to as High. Shifting the speed ratio to a Low side is referred to as a downshift, and shifting the speed ratio to a High side is referred to as an upshift.

Figure 1:
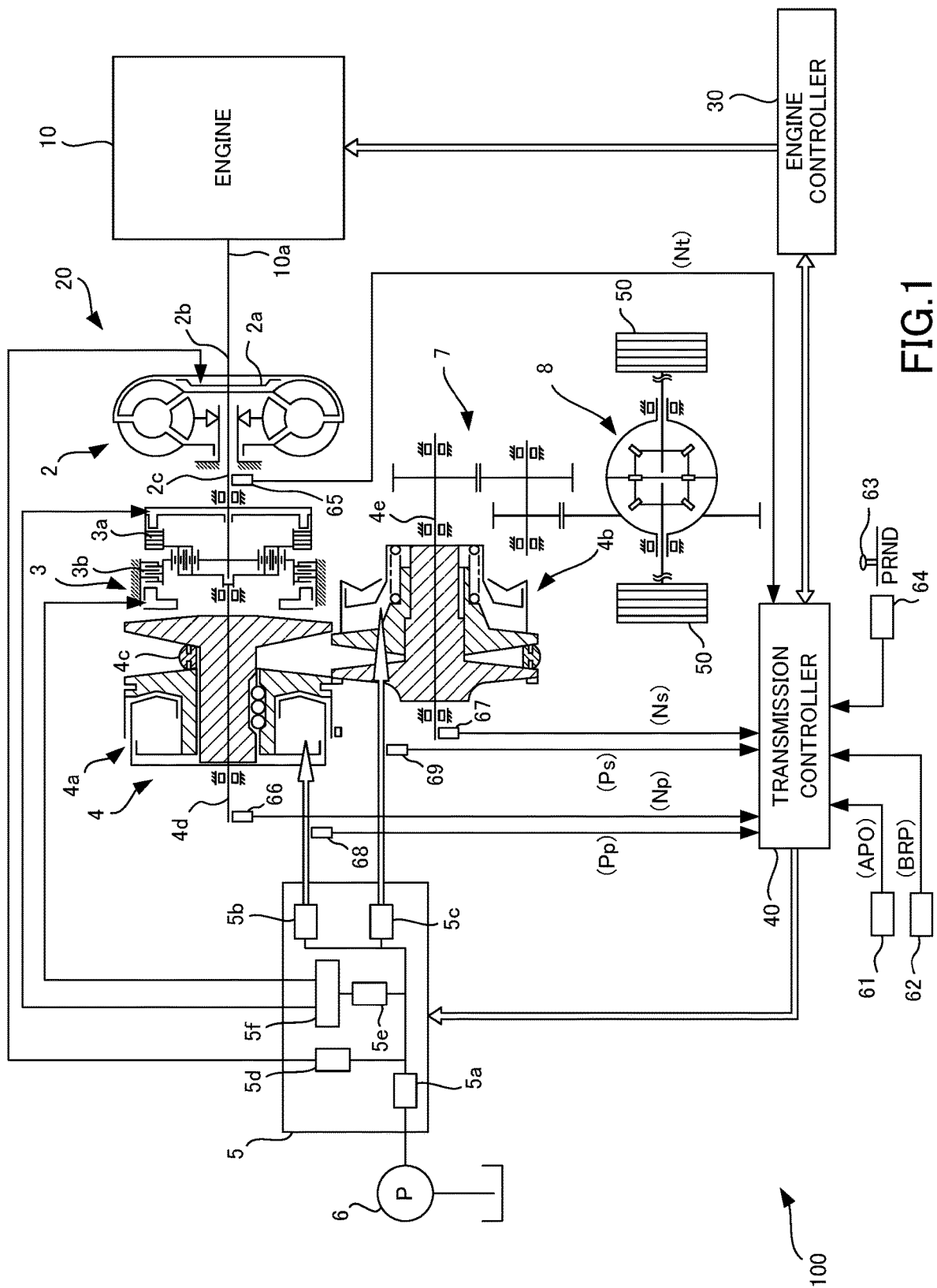
FIG. 1 is a schematic configuration diagram of a vehicle including an automatic transmission according to an embodiment of the present invention.

FIG. 1 is a schematic configuration diagram of a vehicle 100 including an automatic transmission 20 according to an embodiment of the present invention. As shown in FIG. 1, the vehicle 100 includes an engine 10 as a driving source, the automatic transmission 20, an engine controller 30, and a transmission controller 40.

The automatic transmission 20 includes a torque converter 2, a forward/reverse switching mechanism 3 as a power transmission mechanism, a variator 4 as a transmission mechanism, a hydraulic control circuit 5, and an oil pump 6.

In the vehicle 100, rotation generated in the engine 10 is transmitted to driving wheels 50 via the torque converter 2, the forward/reverse switching mechanism 3, the variator 4, a gear set 7, and a differential gear device 8.

The torque converter 2 is provided with a lock-up clutch 2a. When the lock-up clutch 2a is engaged, an input shaft 2b as an input element and an output shaft 2c as an output element of the torque converter 2 are directly coupled to each other, and the input shaft 2b and the output shaft 2c rotate at the same speed. Therefore, in a state in which the lock-up clutch 2a is engaged, rotation of an output shaft 10a of the engine 1 is directly transmitted via the output shaft 2c of the torque converter 2 to the forward/reverse switching mechanism 3.

The forward/reverse switching mechanism 3 includes a double pinion planetary gear set as a main component, a sun gear of the double pinion planetary gear set is coupled to the engine 10 via the torque converter 2, and a carrier of the double pinion planetary gear set is coupled to an input shaft 4d (primary pulley 4a) of the variator 4. The forward/reverse switching mechanism 3 further includes a forward clutch 3a that directly connects the sun gear and the carrier of the double pinion planetary gear set, and a reverse brake 3b that fixes a ring gear. When the forward clutch 3a is engaged, input rotation from the engine 10 via the torque converter 2 is directly transmitted to the primary pulley 4a, and when the reverse brake 3b is engaged, the input rotation from the engine 10 via the torque converter 2 is reversely decelerated and transmitted to the primary pulley 4a.

The variator 4 is a continuously variable transmission mechanism that shifts the rotation of the engine 10 transmitted to the input shaft 4d and transmits the shifted rotation from an output shaft 4e to the driving wheels 50. The variator 4 includes the primary pulley 4a provided on an engine 10 side in a power transmission path, a secondary pulley 4b provided on a driving wheel 50 side in the power transmission path, and a belt 4c as an endless member that is wound around the primary pulley 4a and the secondary pulley 4b.

In the variator 4, a hydraulic pressure supplied to the primary pulley 4a and a hydraulic pressure supplied to the secondary pulley 4b are controlled, so that a contact radius between each of the pulleys 4a and 4b and the belt 4c is changed, and the speed ratio is changed.

The oil pump 6 is a mechanical oil pump that receives the rotation of the engine 10 and is driven using a part of power of the engine 10. Oil discharged from the oil pump 6 is supplied to the hydraulic control circuit 5.

The hydraulic control circuit 5 includes: a regulator valve 5a that adjusts a pressure of hydraulic oil supplied from the oil pump 6 to generate a required hydraulic pressure; a primary solenoid valve 5b that adjusts a hydraulic pressure supplied to the primary pulley 4a; a secondary solenoid valve 5c that adjusts a hydraulic pressure supplied to the secondary pulley 4b; a lock-up solenoid valve 5d that adjusts a hydraulic pressure supplied to the lock-up clutch 2a; a select solenoid valve 5e that adjusts a hydraulic pressure supplied to the forward clutch 3a and a hydraulic pressure supplied to the reverse brake 3b; a manual valve 5f that switches supply paths of the hydraulic pressures to the forward clutch 3a and the reverse brake 3b; and the like.

The hydraulic control circuit 5 supplies the adjusted hydraulic pressure to each of the torque converter 2, the forward/reverse switching mechanism 3, and the variator 4 based on a control signal from the transmission controller 40.

The engine controller 30 is implemented by a microcomputer including a CPU, a RAM, a ROM, an input and output interface, and the like. The engine controller 30 executes various processes by reading and executing, by the CPU, programs stored in the ROM. The engine controller 30 may also be implemented by a plurality of microcomputers.

The engine controller 30 controls a rotation speed, a torque, and the like of the engine 10 based on signals from various sensors each detecting a state of each part of the vehicle 100.

The transmission controller 40 is implemented by a microcomputer including a CPU, a RAM, a ROM, an input and output interface, and the like, and is communicably connected to the engine controller 30. The transmission controller 40 executes various processes by reading and executing, by the CPU, programs stored in the ROM. The transmission controller 40 may also be implemented by a plurality of microcomputers. The transmission controller 40 and the engine controller 30 may be integrated into one controller.

The transmission controller 40 controls an engaged state of the lock-up clutch 2a, the speed ratio of the variator 4, engaged states of the forward clutch 3a and the reverse brake 3b, and the like based on signals from various sensors each detecting a state of each part of the vehicle 100.

The transmission controller 40 receives a signal from an accelerator pedal opening sensor 61 that detects an accelerator pedal opening APO, a signal from a brake hydraulic pressure sensor 62 that detects a brake hydraulic pressure BRP corresponding to an operation amount of a brake pedal, a signal from an inhibitor switch 64 that detects a position of a shifter 63, a signal from a turbine rotation speed sensor 65 that detects a rotation speed Nt (hereinafter referred to as a turbine rotation speed Nt) of the output shaft 2c of the torque converter 2, a signal from a primary rotation speed sensor 66 that detects a rotation speed Np (hereinafter referred to as a primary rotation speed Np) of the input shaft 4d (primary pulley 4a) of the variator 4, a signal from a secondary rotation speed sensor 67 that detects a rotation speed Ns of the output shaft 4e (secondary pulley 4b) of the variator 4, a signal from a primary hydraulic pressure sensor 68 that detects a primary hydraulic pressure Pp supplied to the primary pulley 4a, a signal from a secondary hydraulic pressure sensor 69 that detects a secondary hydraulic pressure Ps supplied to the secondary pulley 4b, and the like.

As described above, the transmission controller 40 controls the speed ratio of the variator 4. Here, in a case in which a calculated actual speed ratio of the variator 4 becomes an abnormal value due to a failure of the primary rotation speed sensor 66 related to the calculation of the speed ratio, in a case in which the transmission controller 40 fails, or the like, it is conceivable that a shift to a target speed ratio causes a downshift that is not intended by a driver. In this case, there is a possibility that the vehicle 100 is decelerated by a braking force of the engine 10 which occurs with the downshift to give a sense of discomfort to the driver.

In view of such circumstances, the transmission controller 40 according to the present embodiment detects the downshift that occurs due to the failure or the like of the primary rotation speed sensor 66, and performs braking force control to reduce the braking force of the engine 10 which occurs with the downshift.

Hereinafter, the transmission controller 40 will be described in detail.

Figure 2:
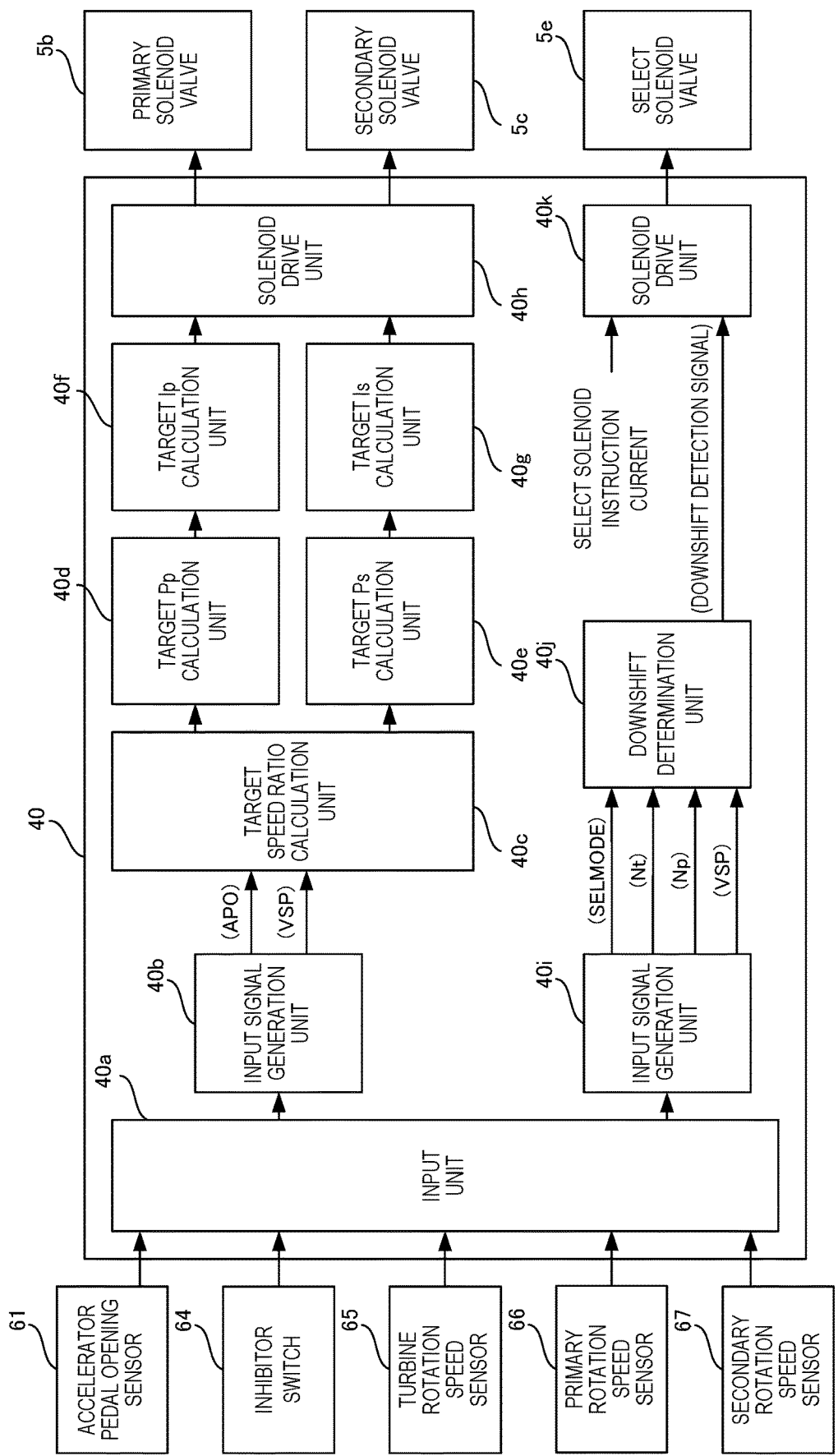
FIG. 2 is a functional block diagram of a transmission controller.

FIG. 2 is a functional block diagram of the transmission controller 40. FIG. 2 shows each function of the transmission controller 40 as a virtual unit, and does not mean physical existence. However, a microcomputer or a device corresponding to a respective one of the functions may physically exist.

As shown in FIG. 2, the transmission controller 40 includes an input unit 40a, an input signal generation unit 40b, a target speed ratio calculation unit 40c, a target Pp calculation unit 40d, a target Ps calculation unit 40e, a target Ip calculation unit 40f, a target Is calculation unit 40g, a solenoid drive unit 40h, an input signal generation unit 40i, a downshift determination unit 40j, and a solenoid drive unit 40k.

The signal from the accelerator pedal opening sensor 61, the signal from the inhibitor switch 64, the signal from the turbine rotation speed sensor 65, the signal from the primary rotation speed sensor 66, the signal from the secondary rotation speed sensor 67, and the like are input to the input unit 40a.

The input signal generation unit 40b generates a signal indicating the accelerator pedal opening APO based on the signal input from the accelerator pedal opening sensor 61 to the input unit 40a. Further, the input signal generation unit 40b generates a signal indicating a vehicle speed VSP based on the signal input from the secondary rotation speed sensor 67 to the input unit 40a.

The target speed ratio calculation unit 40c calculates the target speed ratio of the variator 4 based on the accelerator pedal opening APO and the vehicle speed VSP generated by the input signal generation unit 40b. Instead of the accelerator pedal opening APO, throttle valve opening TVO input from the engine controller 30 may be used.

The target Pp calculation unit 40d calculates a target primary pressure Pp for achieving the target speed ratio based on the target speed ratio calculated by the target speed ratio calculation unit 40c.

The target Ps calculation unit 40e calculates a target secondary pressure Ps for achieving the target speed ratio based on the target speed ratio calculated by the target speed ratio calculation unit 40c.

The target Ip calculation unit 40f calculates a target primary solenoid instruction current Ip for achieving the target primary pressure Pp calculated by the target Pp calculation unit 40d.

The target Is calculation unit 40g calculates a target secondary solenoid instruction current Is for achieving the target secondary pressure Ps calculated by the target Ps calculation unit 40e.

The solenoid drive unit 40h supplies an instruction current to the primary solenoid valve 5b based on the target primary solenoid instruction current Ip calculated by the target Ip calculation unit 40f. Further, the solenoid drive unit 40h supplies an instruction current to the secondary solenoid valve 5c based on the target secondary solenoid instruction current Is calculated by the target Is calculation unit 40g.

The input signal generation unit 40i generates a signal indicating an operation mode SELMODE of the automatic transmission 20 selected by the shifter 63 based on the signal input from the inhibitor switch 64 to the input unit 40a. Further, the input signal generation unit 40i generates a signal indicating the turbine rotation speed Nt based on the signal input from the turbine rotation speed sensor 65 to the input unit 40a. The input signal generation unit 40i generates a signal indicating the primary rotation speed Np based on the signal input from the primary rotation speed sensor 66 to the input unit 40a. Further, the input signal generation unit 40i generates the signal indicating the vehicle speed VSP based on the signal input from the secondary rotation speed sensor 67 to the input unit 40a. The automatic transmission 20 according to the present embodiment has, as operation modes, a forward (D) mode, a reverse (R) mode, a neutral (N) mode, and a parking (P) mode.

The downshift determination unit 40j determines whether the downshift that is not intended by the driver has occurred based on the operation mode SELMODE, the turbine rotation speed Nt, the primary rotation speed Np, the vehicle speed VSP, and the like generated by the input signal generation unit 40i.

Possible causes of the downshift that is not intended by the driver include, for example, the failure of the primary rotation speed sensor 66, a failure of the primary solenoid valve 5b, the failure (actual speed ratio calculation abnormality, target speed ratio calculation abnormality, target Pp calculation abnormality, target Ps calculation abnormality, target Ip calculation abnormality, and target Is calculation abnormality) of the transmission controller 40, and the like.

When the downshift determination unit 40j determines that the downshift that is not intended by the driver has occurred, the downshift determination unit 40j outputs a downshift detection signal to the solenoid drive unit 40k.

When the downshift detection signal is input from the downshift determination unit 40j, the solenoid drive unit 40k adjusts a select solenoid instruction current supplied to the select solenoid valve 5e such that the hydraulic pressure supplied to the forward clutch 3a decreases.

A torque transmission capacity of the forward clutch 3a is reduced as the supplied hydraulic pressure decreases. As a result, the forward clutch 3a slips and the braking force transmitted from the engine 10 to the driving wheels 50 is reduced. Accordingly, deceleration of the vehicle 100 is reduced, and thus it is possible to reduce the sense of discomfort given to the driver.

The hydraulic pressure supplied to the forward clutch 3a may be reduced until the forward clutch 3a is disengaged. Reducing the torque transmission capacity of the forward clutch 3a also includes disengaging the forward clutch 3a to make the torque transmission capacity zero.

Figure 3:
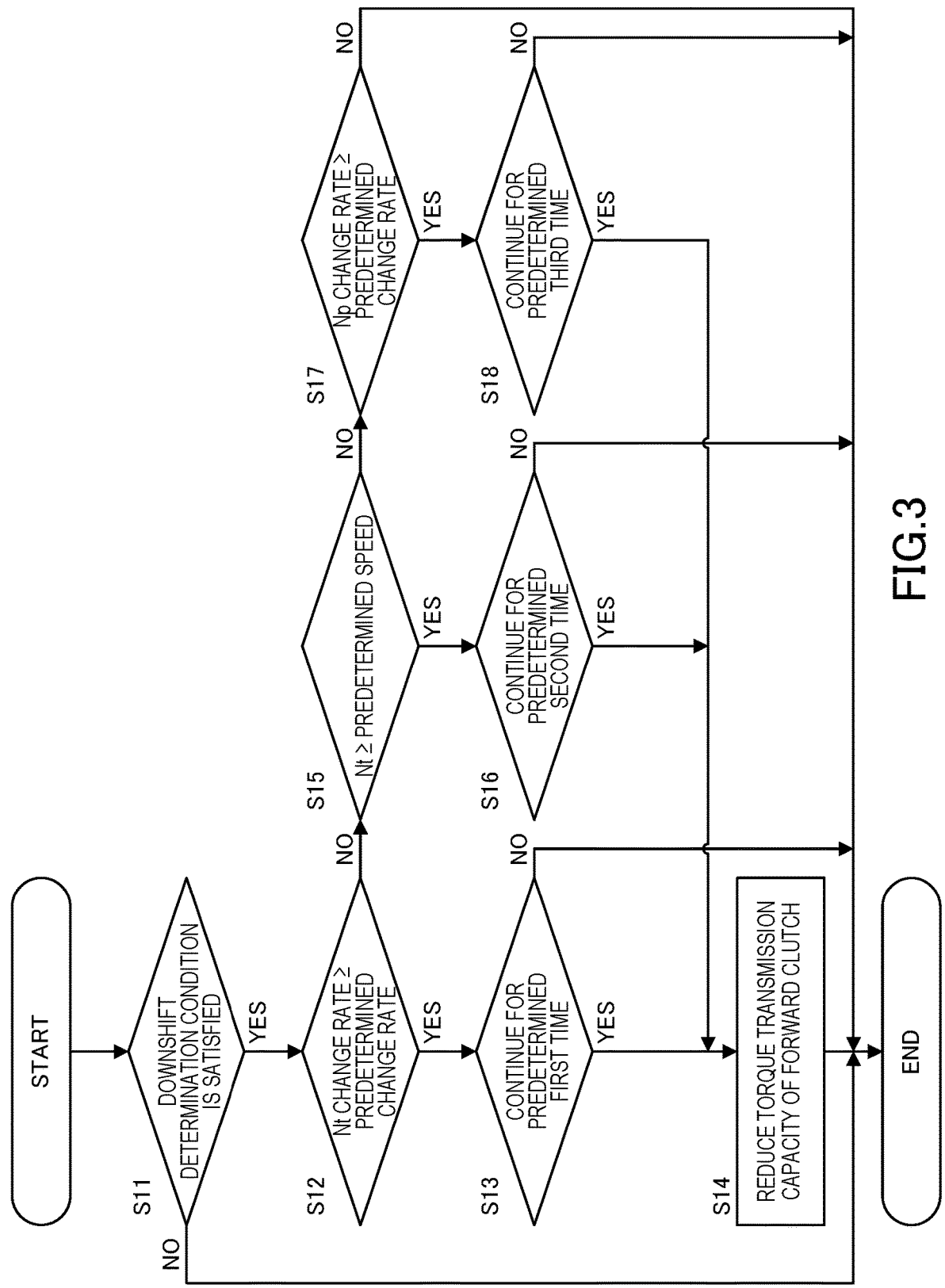
FIG. 3 is a flowchart illustrating a process of braking force control performed by the transmission controller.

Next, a process of the braking force control performed by the transmission controller 40 will be described with reference to FIG. 3. FIG. 3 is a flowchart illustrating the process of the braking force control performed by the transmission controller 40. The process of the braking force control is executed at regular time intervals.

In step S11, the transmission controller 40 determines whether a downshift determination condition for performing downshift determination is satisfied.

The downshift determination condition includes, for example, the following conditions.
  (a) The forward clutch 3a is in the engaged state.
  (b) The vehicle speed VSP is equal to or higher than a predetermined vehicle speed (for example, 40 km/h).
  (c) The operation mode of the automatic transmission 20 is the forward (D) mode.
  (d) The lock-up clutch 2a is in the engaged state.

When all of the conditions (a) to (d) are satisfied, the transmission controller 40 determines that the downshift determination condition is satisfied.

When the transmission controller 40 determines that the downshift determination condition is satisfied, the process proceeds to step S12. Further, when the transmission controller 40 determines that the downshift determination condition is not satisfied, the transmission controller 40 ends the process.

In step S12, the transmission controller 40 performs the downshift determination based on a change rate of the turbine rotation speed Nt. The change rate of the turbine rotation speed Nt is a change amount [rpm/s] of the turbine rotation speed Nt per unit time. Specifically, the transmission controller 40 determines whether the change rate of the turbine rotation speed Nt is equal to or higher than a predetermined change rate.

The predetermined change rate is set to a value at which the braking force of the engine 10 may give the sense of discomfort to the driver when the change rate of the turbine rotation speed Nt is equal to or higher than the predetermined change rate, based on various elements and experimental results of the vehicle 100. In a general vehicle, the predetermined change rate is, for example, 5000 [rpm/s] to 6000 [rpm/s].

The downshift determination in step S12 is performed in the engaged state of the lock-up clutch 2a. Accordingly, in other words, in step S12, the transmission controller 40 determines whether a change rate of a rotation speed of the engine 10 is equal to or higher than the predetermined change rate.

When the transmission controller 40 determines that the change rate of the turbine rotation speed Nt is equal to or higher than the predetermined change rate, the process proceeds to step S13. Further, when the transmission controller 40 determines that the change rate of the turbine rotation speed Nt is not equal to or higher than the predetermined change rate, the process proceeds to step S15.

In step S13, the transmission controller 40 determines whether a state in which the change rate of the turbine rotation speed Nt is equal to or higher than the predetermined change rate has continued for a predetermined first time or more.

When the transmission controller 40 determines that the state in which the change rate of the turbine rotation speed Nt is equal to or higher than the predetermined change rate has continued for the predetermined first time or more, the process proceeds to step S14. Further, when the transmission controller 40 determines that the state in which the change rate of the turbine rotation speed Nt is equal to or higher than the predetermined change rate has not continued for the predetermined first time or more, the transmission controller 40 ends the process.

In step S14, the transmission controller 40 reduces the hydraulic pressure supplied to the forward clutch 3*a* to reduce the torque transmission capacity of the forward clutch 3*a*.

The reason why the torque transmission capacity of the forward clutch 3*a* is reduced when the state in which the change rate of the turbine rotation speed Nt is equal to or higher than the predetermined change rate has continued for the predetermined first time or more is that even if the change rate of the turbine rotation speed Nt is equal to or higher than the predetermined change rate, the driver is less likely to feel uncomfortable for a short time. From this point of view, the predetermined first time is, for example, several tens [ms] to several hundred [ms].

In step S15, the transmission controller 40 performs the downshift determination based on the turbine rotation speed Nt. Specifically, the transmission controller 40 determines whether the turbine rotation speed Nt is equal to or higher than a predetermined speed.

Even if the downshift is not detected in the downshift determination in step S12, the braking force generated by the engine 10 may give the driver the sense of discomfort when the rotation speed of the engine 10 reaches a high rotation speed range. Accordingly, the transmission controller 40 also determines that the downshift has occurred when the turbine rotation speed Nt is equal to or higher than the predetermined speed.

The predetermined speed is set to a value at which the braking force of the engine 10 may give the sense of discomfort to the driver when the turbine rotation speed Nt is equal to or higher than the predetermined speed, based on various elements and experimental results of the vehicle 100. In a general vehicle, the predetermined speed is, for example, 6000 [rpm] to 7000 [rpm]. The predetermined speed may be the same value as an over-revolution setting value of the engine 10.

The downshift determination in step S15 is performed in the engaged state of the lock-up clutch 2*a*. Accordingly, in other words, in step S15, the transmission controller 40 determines whether the rotation speed of the engine 10 is equal to or higher than the predetermined speed.

When the transmission controller 40 determines that the turbine rotation speed Nt is equal to or higher than the predetermined speed, the process proceeds to step S16. When the transmission controller 40 determines that the turbine rotation speed Nt is not equal to or higher than the predetermined speed, the process proceeds to step S17.

In step S16, the transmission controller 40 determines whether a state in which the turbine rotation speed Nt is equal to or higher than the predetermined speed has continued for a predetermined second time or more.

When the transmission controller 40 determines that the state in which the turbine rotation speed Nt is equal to or higher than the predetermined speed has continued for the predetermined second time or more, the process proceeds to step S14. Further, when the transmission controller 40 determines that the state in which the turbine rotation speed Nt is equal to or higher than the predetermined speed has not continued for the predetermined second time or more, the transmission controller 40 ends the process.

The reason for performing the process of step S16 is the same as the reason for performing the process of step S13. Accordingly, the predetermined second time is, for example, several tens [ms] to several hundred [ms]. The predetermined second time may be the same time as the predetermined first time. However, when the predetermined speed is set to the same value as the over-revolution setting value of the engine 10, the predetermined second time is preferably set to a shorter time from the viewpoint of protecting the engine 10.

In step S17, the transmission controller 40 performs the downshift determination based on a change rate of the primary rotation speed Np. Specifically, the transmission controller 40 determines whether the change rate of the primary rotation speed Np is equal to or higher than the predetermined change rate described above.

Even if the primary rotation speed sensor 66 is normal, for example, when the transmission controller 40 fails and various calculations cannot be normally performed, or when the primary solenoid valve 5*b* fails, it is conceivable that the shift to the target speed ratio causes the downshift that is not intended by the driver. Here, when the turbine rotation speed sensor 65 also fails, the downshift cannot be correctly detected in the downshift determination in step S12 and the downshift determination in step S15.

Accordingly, in addition to the downshift determination in step S12 and the downshift determination in step S15, the transmission controller 40 according to the present embodiment performs the downshift determination based on the change rate of the primary rotation speed Np.

The downshift determination in step S17 is performed in the engaged states of the lock-up clutch 2*a* and the forward clutch 3*a*. Accordingly, in other words, in step S17, the transmission controller 40 determines whether the change rate of the rotation speed of the engine 10 is equal to or higher than the predetermined change rate.

When the transmission controller 40 determines that the change rate of the primary rotation speed Np is equal to or higher than the predetermined change rate, the process proceeds to step S18. Further, when the transmission controller 40 determines that the change rate of the primary rotation speed Np is not equal to or higher than the predetermined change rate, the transmission controller 40 ends the process.

In step S18, the transmission controller 40 determines whether a state in which the change rate of the primary rotation speed Np is equal to or higher than the predetermined change rate has continued for a predetermined third time or more.

When the transmission controller 40 determines that the state in which the change rate of the primary rotation speed Np is equal to or higher than the predetermined change rate has continued for the predetermined third time or more, the process proceeds to step S14. Further, when the transmission controller 40 determines that the state in which the change rate of the primary rotation speed Np is equal to or higher than the predetermined change rate has not continued for the predetermined third time or more, the transmission controller 40 ends the process.

The reason for performing the process of step S18 is the same as the reason for performing the process of step S12.

Accordingly, the predetermined third time is, for example, several tens [ms] to several hundred [ms]. The predetermined third time may be the same time as the predetermined first time.

Main functions and effects of the automatic transmission 20 configured as described above will be collectively described.

(1)(5)(7)(8) The automatic transmission 20 includes the variator 4 that shifts the rotation of the engine 10 and transmits the rotation to the driving wheels 50, and the forward clutch 3a as a clutch that controls transmission of the torque from the engine 10 to the driving wheels 50, and when the change rate of the rotation speed of the engine 10 is equal to and higher than the predetermined change rate, the torque transmission capacity of the forward clutch 3a is reduced.

According to this, when the change rate of the rotation speed of the engine 10 is equal to or higher than the predetermined change rate, the torque transmission capacity of the forward clutch 3a is reduced. Accordingly, even if the downshift that is not intended by the driver occurs due to the failure or the like of the primary rotation speed sensor 66, the braking force transmitted from the engine 10 to the driving wheels 50 is reduced, and the deceleration of the vehicle 100 is reduced, and thus it is possible to reduce the sense of discomfort given to the driver. More specifically, the downshift is detected based on the change rate of the rotation speed of the engine 10. Accordingly, it is possible to detect the downshift that is not intended by the driver, which is caused by the failure or the like of the primary rotation speed sensor 66. Further, when the downshift that is not intended by the driver, which is caused by the failure or the like of the primary rotation speed sensor 66 is detected, the torque transmission capacity of the forward clutch 3a provided between the engine 10 and the driving wheels 50 is reduced, and thus the braking force transmitted from the engine 10 to the driving wheels 50 is reduced. Accordingly, since the deceleration of the vehicle 100 is reduced, it is possible to reduce the sense of discomfort given to the driver.

(2) The automatic transmission 20 further includes the torque converter 2 that is provided between the engine 10 and the variator 4 and includes the input shaft 2b coupled to the output shaft 10a of the engine 10, and the lock-up clutch 2a that is provided in the torque converter 2 and directly couples the input shaft 2b and the output shaft 2c of the torque converter 2 when the lock-up clutch 2a is engaged, and when the change rate of the rotation speed Nt (turbine rotation speed Nt) of the output shaft 2c is equal to and higher than the predetermined change rate while the lock-up clutch 2a is engaged, the torque transmission capacity of the forward clutch 3a is reduced.

According to this, the torque transmission capacity of the forward clutch 3a is reduced when the rotation speed Nt of the output shaft 2c of the torque converter 2 is increased. Accordingly, even if the downshift that is not intended by the driver occurs, the braking force transmitted from the engine 10 to the driving wheels 50 is reduced, and the deceleration of the vehicle 100 is reduced, and thus it is possible to reduce the sense of discomfort given to the driver. Further, since the downshift can be detected by the rotation speed Nt of the output shaft 2c of the torque converter 2 is increased, even if the primary rotation speed sensor 66 or the transmission controller 40 fails, or even if there is no information about the rotation speed of the engine 10, it is possible to detect the downshift that is not intended by the driver.

(3) When the change rate of the rotation speed Np (primary rotation speed Np) of the input shaft 4d of the variator 4 is equal to or higher than the predetermined change rate, the automatic transmission 20 reduces the torque transmission capacity of the forward clutch 3a.

According to this, the torque transmission capacity of the forward clutch 3a is reduced when the rotation speed Np of the input shaft 4d of the variator 4 is increased. Accordingly, even if the downshift that is not intended by the driver occurs, the braking force transmitted from the engine 10 to the driving wheels 50 is reduced, and the deceleration of the vehicle 100 is reduced, and thus it is possible to reduce the sense of discomfort given to the driver. Further, since the downshift can be detected when the rotation speed Np of the input shaft 4d of the variator 4 is increased, even if the turbine rotation speed sensor 65 fails, it is possible to detect the downshift that is not intended by the driver.

(4) The variator 4 of the automatic transmission 20 is the continuously variable transmission mechanism including the primary pulley 4a provided on the engine 10 side, the secondary pulley 4b provided on the driving wheel 50 side, and the belt 4c wound around the primary pulley 4a and the secondary pulley 4b.

In the continuously variable transmission mechanism, even if the downshift that is not intended by the driver occurs due to the failure, the braking force transmitted from the engine 10 to the driving wheels 50 is reduced, and the deceleration of the vehicle 100 is reduced, and thus it is also possible to reduce the sense of discomfort given to the driver.

(6) The automatic transmission 20 may reduce the torque transmission capacity until the forward clutch 3a is disengaged when the torque transmission capacity of the forward clutch 3a is reduced.

According to this, since the engine 10 and the driving wheels 50 can be separated from each other, it is possible to further prevent the deceleration of the vehicle 100 due to the downshift that is not intended by the driver.

While an embodiment of the invention has been described, the embodiment is merely one of application examples of the invention, and does not intend to limit a technical scope of the invention to a specific configuration according to the embodiment.

For example, in the above embodiment, the case in which a clutch that controls transmission of the torque from the driving source to the driving wheels is the forward clutch 3a has been described. However, the clutch that controls the transmission of the torque from the driving source to the driving wheels may be another clutch provided on the power transmission path from the driving source to the driving wheels.

In the above embodiment, the case in which the transmission mechanism is the variator 4 has been described. However, the transmission mechanism may be another continuously variable transmission mechanism or a stepped transmission mechanism.

Various programs executed by the transmission controller 40 may be stored in a non-transitory recording medium such as a CD-ROM.

DESCRIPTION OF REFERENCE SIGNS 10 engine (driving source)
10a output shaft
20 automatic transmission
40 transmission controller (computer)
50 driving wheel 2 torque converter
2a lock-up clutch
2b input shaft (input element)
2c output shaft (output element)
3a forward clutch (clutch)
4 variator (transmission mechanism, continuously variable transmission mechanism)
4a primary pulley
4b secondary pulley
4c belt (endless member)
4d input shaft

The invention claimed is:

1. An automatic transmission, comprising:
a transmission mechanism configured to shift rotation of a driving source and transmit the rotation to a driving wheel; and
a clutch configured to control transmission of a torque from the driving source to the driving wheel, wherein
when a selected operation mode is a forward mode and a change rate at which a rotation speed of the driving source increases is equal to or higher than a predetermined change rate, a torque transmission capacity of the clutch is reduced, and a braking force transmitted from the driving source to the driving wheel is reduced.

2. The automatic transmission according to claim 1, further comprising:
a torque converter that is provided between the driving source and the transmission mechanism and includes an input element coupled to an output shaft of the driving source; and
a lock-up clutch that is provided in the torque converter and directly couples the input element and an output element of the torque converter when the lock-up clutch is engaged, wherein
when a change rate of a rotation speed of the output element is equal to or higher than the predetermined change rate in a state in which the lock-up clutch is engaged, the torque transmission capacity of the clutch is reduced.

3. The automatic transmission according to claim 1, wherein
when a change rate of a rotation speed of an input shaft of the transmission mechanism is equal to or higher than the predetermined change rate, the torque transmission capacity of the clutch is reduced.

4. The automatic transmission according to claim 1, wherein
the transmission mechanism is a continuously variable transmission mechanism including a primary pulley provided on a driving source side, a secondary pulley provided on a driving wheel side, and an endless member wound around the primary pulley and the secondary pulley.

5. The automatic transmission according to claim 1, wherein
the clutch is a forward clutch.

6. The automatic transmission according to claim 1, wherein
when the torque transmission capacity of the clutch is reduced, the torque transmission capacity is reduced until the clutch is disengaged.

7. A control method for an automatic transmission including a transmission mechanism configured to shift rotation of a driving source and transmit the rotation to a driving wheel, and a clutch configured to control transmission of a torque from the driving source to the driving wheel, the control method comprising:
reducing a torque transmission capacity of the clutch to reduce a braking force transmitted from the driving source to the driving wheel when a selected operation mode is a forward mode and a change rate at which a rotation speed of the driving source increases is equal to or higher than a predetermined rate.

8. A non-transitory computer-readable medium storing program executable by a computer of an automatic transmission including a transmission mechanism configured to shift rotation of a driving source and transmit the rotation to a driving wheel, and a clutch configured to control transmission of a torque from the driving source to the driving wheel, wherein
the program causes the computer to execute instructions for:
reducing a torque transmission capacity of the clutch to reduce a braking force transmitted from the driving source to the driving wheel when a selected operation mode is a forward mode and a change rate at which a rotation speed of the driving source increases is equal to or higher than a predetermined rate.

* * * * *